(12) United States Patent
Flowers et al.

(10) Patent No.: US 7,985,361 B2
(45) Date of Patent: Jul. 26, 2011

(54) SPINNING LOW FLUOROSURFACTANT FLUOROPOLYMER DISPERSIONS

(75) Inventors: Devin Flowers, Kennett Square, PA (US); Clay Woodward Jones, Fort Collins, CO (US); Robert John Cavanaugh, Cincinnati, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 500 days.

(21) Appl. No.: 12/124,271

(22) Filed: May 21, 2008

(65) Prior Publication Data

US 2008/0221250 A1 Sep. 11, 2008

Related U.S. Application Data

(62) Division of application No. 11/494,893, filed on Jul. 28, 2006, now Pat. No. 7,390,448.

(60) Provisional application No. 60/706,102, filed on Aug. 5, 2005, provisional application No. 60/716,350, filed on Sep. 12, 2005.

(51) Int. Cl.
 *D01F 6/12* (2006.01)
(52) U.S. Cl. ......... 264/127; 428/421; 524/500; 525/191
(58) Field of Classification Search .................. 264/127; 428/421; 525/191; 524/500
 See application file for complete search history.

(56) References Cited

U.S. PATENT DOCUMENTS

| | | | |
|---|---|---|---|
| 2,559,752 A | | 7/1951 | Berry |
| 2,772,444 A | * | 12/1956 | Lawton et al. ................. 264/127 |
| 3,037,953 A | | 6/1962 | Marks et al. |
| 3,114,672 A | | 12/1963 | Schott |
| 3,655,853 A | * | 4/1972 | Gallup ........................... 264/127 |
| 3,819,594 A | | 6/1974 | Holmes et al. |
| 3,882,153 A | | 5/1975 | Seki et al. |
| 4,282,162 A | | 8/1981 | Kuhls |
| 4,369,266 A | | 1/1983 | Kuhls et al. |
| 4,629,654 A | * | 12/1986 | Sasaki et al. .................. 428/373 |
| 4,837,267 A | | 6/1989 | Malhotra |
| 5,286,807 A | | 2/1994 | Flexman, Jr. |
| 5,318,813 A | | 6/1994 | Flexman, Jr. |
| 5,344,882 A | | 9/1994 | Flexman |
| 5,723,081 A | * | 3/1998 | Blankenbeckler et al. ... 264/127 |
| 5,762,846 A | * | 6/1998 | Blankenbeckler et al. ... 264/127 |
| 5,820,984 A | | 10/1998 | Blankenbeckler et al. |
| 2003/0125421 A1 | | 7/2003 | Bladel et al. |
| 2005/0143494 A1 | * | 6/2005 | Jones ............................ 523/201 |
| 2005/0222313 A1 | | 10/2005 | Tomihashi et al. |
| 2005/0228072 A1 | | 10/2005 | Winkler et al. |
| 2006/0135681 A1 | | 6/2006 | Cavanaugh |
| 2006/0183842 A1 | * | 8/2006 | Johnson ........................ 524/544 |

FOREIGN PATENT DOCUMENTS

| | | | |
|---|---|---|---|
| JP | 60-231815 | * | 11/1985 |
| WO | WO 98/28469 | | 2/1998 |
| WO | WO-98/28469 | * | 7/1998 |
| WO | WO 2007/019156 A2 | | 2/2007 |
| WO | WO-2007/019156 A2 | * | 2/2007 |

* cited by examiner

*Primary Examiner* — Peter D. Mulcahy
*Assistant Examiner* — Henry Hu

(57) ABSTRACT

A process for dispersion spinning non-melt-processible fluoropolymer fiber in which a mixture of an aqueous dispersion of non-melt-processible polytetrafluoroethylene or modified polytetrafluoroethylene fluoropolymer particles and an aqueous solution of matrix polymer is formed. The non melt-processible particles have an SSG of less than about 2.40. The aqueous dispersion contains an aliphatic alcohol ethoxylate nonionic surfactant having a 20% residuals temperature determined by thermogravimetric analysis (TGA) of less than about 290° C. and is essentially free of surfactants containing aromatic groups. The dispersion has a fluorinated surfactant content of less than about 300 ppm. The mixture is extruded into a coagulation bath containing a concentration of ions which coagulate the matrix polymer to form an intermediate fiber structure. The intermediate fiber structure is sintered to decompose the matrix polymer and coalesce. The present invention also provides a spinning composition useful for the dispersion spinning of non-melt-processible fluoropolymer fiber.

7 Claims, No Drawings

US 7,985,361 B2

SPINNING LOW FLUOROSURFACTANT FLUOROPOLYMER DISPERSIONS

FIELD OF THE INVENTION

This invention relates to a process for dispersion spinning non-melt-processible fluoropolymers to form fibers.

BACKGROUND OF THE INVENTION

Polytetrafluoroethylene (PTFE) homopolymers and related modified PTFE polymers have exceptional stability to light, heat, solvents, chemical attack and electrical stresses, conferring desirable properties to articles made from these polymers. But because of the inability to melt process these polymers and the difficulties associated with solution processing, it is very difficult to spin or shape them by conventional methods. Therefore other processes have been developed for preparing fibers of PTFE homopolymers and modified PTFE.

Dispersion spinning is one method developed for producing shaped articles such as fibers from fluorinated polymers. Non-melt processible fluoropolymers may be successfully spun from a mixture of an aqueous dispersion of fluorinated polymer particles mixed with a solution of a suitable matrix polymer. An intermediate structure is formed when this mixture is contacted with a suitable coagulation bath. Although the intermediate structure is mechanically sound, a final, sintered structure is generally formed by heating the intermediate structure to a temperature sufficient to coalesce the fluorinated polymer particles. On sintering the matrix polymer decomposes to form volatile gases and a carbonaceous residue.

Fluorosurfactants are typically used in the dispersion polymerization of fluoropolymers, the fluorosurfactants functioning as a non-telogenic dispersing agent, as described in U.S. Pat. No. 2,559,752 to Berry. Unless removed, fluorosurfactant is present in fluoropolymer dispersions and is present in the fiber spinning compositions made from such dispersions. However because of environmental concerns, processes have been developed to reduce the fluorosurfactant content in aqueous fluoropolymer dispersions to decrease emissions of fluorosurfactants and/or decrease or eliminate the need to capture fluorosurfactants during end use processing of fluoropolymer dispersions.

Several techniques are known for the reduction of fluorosurfactant content from fluoropolymer dispersions such as concentration by ultrafiltration as described in U.S. Pat. No. 4,369,266 (Kuhls et al.) and contact with ion exchange resin as described in U.S. Pat. No. 3,882,153 (Seki et al), U.S. Pat. No. 4,282,162 (Kuhls) and US 2003/0125421 A1 (Bladel et al.).

Fluoropolymer dispersions are typically subjected to a concentration step after manufacture to increase their concentration. Nonionic surfactants are usually added prior to concentration to increase the stability of the dispersion. For use in known fiber spinning processes, fluoropolymer dispersions containing alkyl phenol ethoxylates have been used for stabilizing and concentrating fluoropolymer dispersions. However, alkyl phenol ethoxylates are prone to causing smoking during sintering of the fiber, causing foaming in wash water, and forming deposits on rolls which contact the fiber. In addition, because of environmental concerns about compounds containing aromatic groups, it is desirable to avoid alkyl phenol ethoxylates which contain aromatic groups.

An improved fluoropolymer spinning process and spinning composition are desired that employ fluoropolymer dispersions with reduced fluorosurfactant content and which overcome problems associated with alkyl phenol ethoxylate nonionic surfactants.

SUMMARY OF THE INVENTION

The invention is based on the discovery that a fluoropolymer fiber spinning composition of aqueous fluoropolymer dispersion having a low surfactant content, containing an aliphatic alcohol ethoxylate nonionic surfactant having a 20% residuals temperature determined by thermogravimetric analysis (TGA) of less than about 290° C., and being essentially free of surfactants containing aromatic groups, can provide significant advantages in producing fluoropolymer fibers.

The present invention provides a process for dispersion spinning non-melt-processible fluoropolymer fiber in which a mixture of an aqueous dispersion of non-melt-processible polytetrafluoroethylene or modified polytetrafluoroethylene fluoropolymer particles and an aqueous solution of matrix polymer is formed. The non melt-processible particles have an SSG of less than about 2.40. The aqueous dispersion contains an aliphatic alcohol ethoxylate nonionic surfactant having a 20% residuals temperature determined by thermogravimetric analysis (TGA) of less than about 290° C. and is essentially free of surfactants containing aromatic groups. The dispersion has a fluorinated surfactant content of less than about 300 ppm. The mixture is extruded into a coagulation bath containing a concentration of ions which coagulate the matrix polymer to form an intermediate fiber structure. The intermediate fiber structure is sintered to decompose the matrix polymer and coalesce the non-melt-processible fluoropolymer particles to form the fiber.

The present invention also provides a spinning composition useful for the dispersion spinning of non-melt-processible fluoropolymer fiber. The composition comprises a mixture of an aqueous solution of a matrix polymer and an aqueous dispersion of non-melt-processible polytetrafluoroethylene or modified polytetrafluoroethylene particles having an SSG of less than about 2.40. The aqueous dispersion contains an aliphatic alcohol ethoxylate nonionic surfactant having a 20% residuals temperature determined by thermogravimetric analysis (TGA) of less than about 290° C. and is essentially free of surfactants containing aromatic groups. The dispersion has a fluorinated surfactant content of less than about 300 ppm.

In a preferred embodiment of the invention, the 20% residuals temperature determined by TGA of said aliphatic alcohol ethoxylate employed in the non-melt-processible polytetrafluoroethylene or modified polytetrafluoroethylene dispersion is less than about 285° C., most preferably less than about 280° C.

In another preferred embodiment of the invention, the five minute foam height determined by ASTM D 1173-53 of the aliphatic alcohol ethoxylate surfactant employed in the non-melt-processible polytetrafluoroethylene or modified polytetrafluoroethylene dispersion is less than about 100 mm, more preferably less than about 50 mm, and most preferably less than about 20 mm.

Another embodiment of the present invention provides a process for dispersion spinning non-melt-processible fluoropolymer fiber in which a mixture of an aqueous dispersion of non-melt-processible polytetrafluoroethylene or modified polytetrafluoroethylene fluoropolymer particles and an aqueous solution of matrix polymer is formed. The non melt-processible particles have an SSG of less than about 2.40. The aqueous dispersion contains an aliphatic alcohol ethoxylate nonionic surfactant having a thermal decomposition temperature determined by thermogravimetric analysis (TGA) of less than about 250° C. and is essentially free of surfactants containing aromatic groups. The dispersion has a fluorinated surfactant content of less than about 300 ppm. The mixture is extruded into a coagulation bath containing a concentration of ions which coagulate the matrix polymer to form an intermediate fiber structure. The intermediate fiber structure is sintered to decompose the matrix polymer and coalesce the non-melt-processible fluoropolymer particles to form the fiber.

Another preferred embodiment of the present invention provides a spinning composition useful for the dispersion spinning of non-melt-processible fluoropolymer fiber. The composition comprises a mixture of an aqueous solution of a matrix polymer and an aqueous dispersion of non-melt-processible polytetrafluoroethylene or modified polytetrafluoroethylene particles having an SSG of less than about 2.40. The aqueous dispersion contains an aliphatic alcohol ethoxylate nonionic surfactant having a thermal decomposition temperature determined by thermogravimetric analysis (TGA) of less than about 250° C. and is essentially free of surfactants containing aromatic groups. The dispersion has a fluorinated surfactant content of less than about 300 ppm.

In a more preferred embodiments of this form of the invention, the thermal decomposition temperature determined by TGA of said aliphatic alcohol ethoxylate employed in the non-melt-processible polytetrafluoroethylene or modified polytetrafluoroethylene dispersion is less than about 240° C., most preferably less than about 230° C.

In accordance with a particularly preferred embodiment of the invention, an aqueous dispersion is provided which comprises non-melt-processible polytetrafluoroethylene or modified polytetrafluoroethylene particles having an SSG of less than about 2.40. The aqueous dispersion contains an aliphatic alcohol ethoxylate nonionic surfactant, the aliphatic alcohol ethoxylate surfactant being an ethoxylate of 2,6,8-trimethyl-4-nananol and having a five minute foam height determined by ASTM D 1173-53 of less than about 20 mm.

DETAILED DESCRIPTION

Fluoropolymers

The fluoropolymer particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. The modified PTFE contains a small amount of comonomer modifier which improves film forming capability during baking (fusing), such as perfluoroolefin, notably hexafluoropropylene (HFP) or perfluoro(alkyl vinyl)ether (PAVE), where the alkyl group contains 1 to 5 carbon atoms, with perfluoro(ethyl vinyl) ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1\times10^9$ Pa·s. The resins in the dispersion used in this invention when isolated and dried are non-melt-processible. Such high melt viscosity indicates that the PTFE does not flow in the molten state and therefore is non-melt-processible.

By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In one preferred embodiment, the fluoropolymer particles in the dispersion used in this invention comprise a core of high molecular weight polytetrafluoroethylene (PTFE) and a shell of lower molecular weight polytetrafluoroethylene or modified polytetrafluoroethylene.

The fluoropolymer particles have a standard specific gravity (SSG) of less than 2.40, typically from about 2.14 to about 2.40, preferably less than about 2.30, and more preferably less than about 2.25. The SSG is generally inversely proportional to the molecular weight of PTFE or modified PTFE.

The fluoropolymer particles in the dispersion used in this invention preferably have a number average particle size of about 100 nm to about 400 nm, most preferably, about 120 nm to about 220 nm.

The fluoropolymer dispersion used in this invention is made by dispersion polymerization (also known as emulsion polymerization). A typical process for the aqueous dispersion polymerization of preferred polymer PTFE is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with nonionic surfactant.

The dispersing agent used in this process is preferably a fluorinated surfactant. The fluorosurfactant in the dispersion is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms and bearing fluorine atoms and having no more than two carbon atoms not bearing fluorine atoms adjacent to the hydrophilic group. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic or sulfonic acid having 6-10 carbon atoms and is typically used in salt form. Suitable fluorosurfactants are ammonium perfluorocarboxylate, e.g., ammonium perfluorocaprylate or ammonium perfluorooctanoate. The fluorosurfactants are usually present in the amount of 0.02 to 1 wt % with respect to the amount of polymer formed. The fluorinated surfactant is used to aid the polymerization process but the amount remaining in the concentrated dispersion composition used in the fiber spinning process is significantly reduced as will be explained below.

The initiators preferably used to make dispersion for use in the process of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators, small amounts of short chain dicarboxylic acids such as succinic acid or initiators that produce succinic acid such as disuccinic acid peroxide (DSP) may be also be added in order to reduce coagulum To produce dispersion with low fluorosurfactant content as described below, sufficient nonionic surfactant is added to prevent coagulation of the dispersion when the fluorosurfactant content is reduced. Typically, nonionic surfactant is added for stabilization prior to fluorosurfactant reduction and then as desired, concentration of the dispersion is conducted. For concentrating, the polymer is held at a temperature above the cloud point of the nonionic surfactant. Once concentrated to about 30 to about 70 weight % fluoropolymer, and preferably about 45 to about 65 weight % fluoropolymer, the upper clear supernate is removed. Further adjustment of the final solids concentration and surfactant are made as needed. One patent illustrative of concentrating is U.S. Pat. No. 3,037,953 to Marks and Whipple.

Nonionic Surfactants

Nonionic surfactants used in dispersions employed in accordance with the invention are aliphatic alcohol ethoxylates. They are preferably present in the dispersion in amounts of about 2 to about 11 weight %, most preferably about 3 to about 11 weight %, based on the weight of said fluoropolymer. Suitable nonionic surfactants include any of a variety of aliphatic alcohol ethoxylates or mixtures thereof which provide the desired cloud point during concentration. The aliphatic alcohol ethoxylates employed in carrying out the present invention also have a 20% residuals temperature determined by TGA of less than about 290° C., preferably less than 285° C. more preferably less than 280° C. and typically fall within the preferred range of 250° C. to 290° C. In addition or in the alternative, it is preferred that the aliphatic alcohol ethoxylate nonionic surfactant has a thermal decomposition temperature determined by thermogravimetric analysis (TGA) of less than about 250° C., more preferably less than about 240° C., most preferably less than about 230° C.

Further the dispersions used in this invention are essentially free of surfactants containing aromatic groups that can thermally decompose and be converted to harmful organic aromatic compounds that may adversely affect air and water quality during dispersion spinning processes. In addition, these materials are prone to producing tar-like buildup on sintering rolls, producing smoke and causing foaming in wash water. Essentially free of essentially free of surfactants containing aromatic groups preferably means that the dispersions employed contain less than about 0.5 weight % of such surfactants. The surfactants used in this invention burn off cleanly without thermally decomposing on a substrate leaving lower residuals than alkyl phenol ethoxylates. The preferred alcohol ethoxylate surfactants used in this invention burn off at a lower temperature (about 50° C. lower) than the conventional alkyl phenol ethoxylates. As will be further discussed below, this lower burnoff temperature results in a much improved fiber spinning process. Further, a cleaner burnoff that leaves low residuals and avoids catalyzing polymer decomposition at high application temperatures thus leading to fluoropolymer fiber with higher thermal stability.

In addition the surfactants used in this invention preferably generate less foam during fiber processing. Reduced foam generation can be quantified by the Ross-Miles Foam test measuring five minute foam height (ASTM D 1173-53, reapproved 2001) as detailed below in the Methods for Property Determination. The five minute foam height for the aliphatic alcohol ethoxylates used in the present invention is preferably less than about 100 mm and more preferably less than about 50 mm, and most preferably less than about 20 mm. Foam height as shown in the test data below indicates that fiber spinning compositions containing alkyl phenol ethoxylates will retain foam over longer periods of times than aliphatic alcohol ethoxylate nonionic surfactant used in this invention having a lower 20% residuals temperature and being essentially free of aromatic groups. Foam retention is detrimental to fiber processing leading to spinning breaks and causing the fiber manufacturer to take have to take time-consuming steps to control and reduce foam generation, thereby affecting productivity.

Especially preferred aliphatic alcohol ethoxylates are a compound or mixture of compounds of the formula:

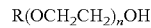

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18. For example, a preferred ethoxylate used in this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate used in accordance with this invention does not contain an aromatic group. The number of ethylene oxide units in the hydrophilic portion of the molecule may comprise either a broad or narrow monomodal distribution as typically supplied or a broader or bimodal distribution which may be obtained by blending.

The cloud point of a surfactant is a measure of the solubility of the surfactant in water. The surfactants employed in the aqueous dispersion of this invention preferably have a cloud point of about 30° C. to about 90° C., preferably about 35° C. to about 85° C.

Nonionic surfactants of the type generally used to stabilize fluoropolymer dispersions can be either liquids or solids at room temperature. If solid, the surfactant tends to be pasty and difficult to handle. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

Generally low viscosity liquids are preferred from a handling point of view. High viscosity liquids are more difficult to handle and often require heated tanks and lines to keep the viscosity low enough for ease in handling. Some of the apparent liquid surfactants are physically meta-stable in that they may exist as liquids for several days and then turn into pasty solids. Sometimes water is added to the surfactant to lower its viscosity and making it easier to handle. However, too much water detracts from the desire to produce more concentrated dispersions.

The aqueous dispersion of non-melt-processible fluoropolymer particles and nonionic surfactant used in this invention preferably contains a nonionic surfactant containing 0-20 weight % water, preferably 0-15 weight % water and is a stable liquid at room temperature. A surfactant is considered to be a stable liquid if it remains liquid for 3 days at room temperature after being chilled to 5° C. and then warmed to room temperature (about 23±3° C.).

Dispersions containing nonionic surfactant made as described herein thus are stabilized fluorosurfactant-containing dispersions suitable for use in the reduction of the fluorosurfactant content as will be described below.

Examples of useful aliphatic alcohol ethoxylates surfactants for this invention are listed in Tables 1 and 2 and are contrasted to less desirable alkyl phenol ethoxylate surfactants, such as Triton® X-100.

In accordance with a particularly preferred embodiment of the invention, an aqueous dispersion is provided which comprises non-melt-processible polytetrafluoroethylene or modified polytetrafluoroethylene particles having an SSG of less than about 2.40. The aqueous dispersion contains an aliphatic alcohol ethoxylate nonionic surfactant, the aliphatic alcohol ethoxylate surfactant being an ethoxylate of 2,6,8-trimethyl-4-nananol and having a five minute foam height determined by ASTM D 1173-53 of less than about 20 mm. Preferably, the aqueous dispersion has a fluorinated surfactant content of less than about 300 ppm. It is also preferred for the aqueous dispersion to be essentially free of surfactants containing aromatic groups.

In a more preferred form of this dispersion, the aliphatic alcohol ethoxylate nonionic surfactant comprises ethoxylates of 2,6,8-trimethyl-4-nananol having an average of about 4 to about 12 ethylene oxide (EO) units, most preferably, ethoxylates of 2,6,8-trimethyl-4-nananol having an average about 9 to about 11 ethylene oxide units. Examples of preferred surfactants of this type are those sold under the trademark Tergitol® TMN-6 (nominally 6 EO units) and Tergitol® TMN-10 (nominally 10 EO units).

Fluorosurfactant Reduction

The fluorosurfactant content of the aqueous dispersion of non-melt-processible PTFE or modified PTFE particles used in accordance with the present invention is reduced to a predetermined level of no greater than about 300 ppm, preferably to a predetermined level no greater than about 100 ppm, more preferably to a predetermined level no greater than about 50 ppm.

While any suitable method can be used to reduce fluorosurfactant content, contacting the aqueous dispersion with an anion exchange resin is advantageously used for this purpose. Contacting of the dispersion with anion exchange resin can occur before or after concentration but typically the lower solids material before concentration is easier to process, especially when a fixed bed is employed for carrying out the contacting step. If the process is carried out prior to concentration, nonionic surfactants are added prior to contact with the anion exchange resin as discussed above. Further, it is common to add a nonfluorinated anionic surfactant such as sodium lauryl sulfate to the dispersion prior to concentration to prevent a viscosity increase which can occur upon concentration. A nonfluorinated cationic surfactant can also be used as described in U.S. Application No. 60/638,310, filed Dec. 22, 2004.

Any of a variety of techniques which bring the dispersion in contact with the anion exchange resin can be used to carry out ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate or a viscosity increase in observed. Upper treatment temperature will vary with the type of polymer and nonionic surfactant employed. Typically, temperatures will be between 20° C. and 80° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

Ion Exchange Resins

The ion exchange resins for use in accordance with reducing the fluorosurfactant content of the aqueous dispersion used in the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used to reduce fluorosurfactant for use in the process of the present invention is preferably monodisperse. Preferably, the ion exchange resin beads have a number average size distribution in which 95% of the beads have a diameter within plus or minus 100 μm of the number average bead diameter.

The monodisperse ion exchange resin has a particle size which provides a suitable pressure drop through the bed. As discussed previously, very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Spinning Composition and Matrix Polymers

The present invention provides a spinning composition useful for the dispersion spinning of non-melt-processible fluoropolymer fiber comprising a mixture of an aqueous solution of a matrix polymer and an aqueous dispersion of non-melt-processible polytetrafluoroethylene or modified polytetrafluoroethylene particles having an SSG of less than about 2.40, typically from about 2.14 to about 2.40. The aqueous dispersion containing an aliphatic alcohol ethoxylate nonionic surfactant and being essentially free of surfactants containing aromatic groups and the aliphatic alcohol ethoxylate has a 20% residuals temperature determined by thermogravimetric analysis (TGA) of less than about 290° C., preferably less than 285° C., most preferably less than 280° C. and especially preferred in the range of 250° C. to 290° C. In addition or in the alternative, it is preferred that the aliphatic alcohol ethoxylate nonionic surfactant has a thermal decomposition temperature determined by thermogravimetric analysis (TGA) of less than about 250° C., more preferably less than about 240° C., most preferably less than about 230° C. The dispersion has a fluorinated surfactant content of less than about 300 ppm, preferably less than about 100 ppm, more preferably less than about 50 ppm. In preferred embodiments the non-melt-processible fluoropolymer particles have an SSG of less than 2.30, and more preferably less than about 2.25.

In one preferred embodiment, the five minute foam height of the aliphatic alcohol ethoxylate surfactant is less than about 100 mm, more preferably less than 50 mm, and most preferably less than about 20 mm. Process advantages for surfactants that have reduced foaming in a fiber spinning composition are discussed below.

In another preferred embodiment, the spinning composition contains fluoropolymer particles comprising a core of high molecular weight polytetrafluoroethylene and a shell of lower molecular weight polytetrafluoroethylene or modified polytetrafluoroethylene.

Matrix polymers used in the practice of the present invention may be polymers containing only hydrogen, carbon, oxygen and nitrogen that are soluble in aqueous solutions that may be coagulated or precipitated by a salt or a shift of pH. As taught in U.S. Pat. Nos. 3,655,853; 3,114,672; and 2,772,444 cellulose xanthate may be the soluble form of the matrix. However, the use of viscose in fiber forming suffers from serious disadvantages related to cost of manufacture, production time and environmental hazards. Alternatives to viscose forming have been developed and most recently a process using cellulosic ethers with a uniform degree of substitution of the matrix has been fully described in U.S. Pat. Nos. 5,762,846 and 5,820,984.

Cellulosic ether polymers are preferred since these polymers do not melt or soften below the temperature range in which most fluorinated olefinic polymers melt and the polymer decomposes into carbonaceous material on sintering. For example, such cellulosic polymers are methylcellulose, hydroxyethylcellulose, methylhydroxypropylcellulose, hydroxypropylmethylcellulose, hydroxypropylcellulose, ethylcellulose and carboxymethylcellulose. The cellulosic ethers preferred for use in this invention as a matrix polymer have a uniform degree of substitution, and are soluble in strong aqueous alkali hydroxide, but insoluble in near neutral pH water. By the term near neutral pH water is meant water having a pH from about 6 to 8. In addition, the matrix polymers used in the practice of the present invention have no softening or melting point. These polymers decompose at temperatures near the sintering temperature of the fiber providing requisite tensile strength until the fluoropolymer particles have coalesced such that the resultant fluoropolymer structure provides the necessary tensile strength.

The structural features that are strongly related to solubility of the cellulosic ethers are the functionality of chemical substituents in the cellulose ethers and the degree of substitution. By degree of substitution (DS) is meant the extent to which the hydroxyl groups of a cellulose molecule have been replaced with ether functional groups.

In a cellulose molecule, there are three hydroxyl groups per anhydroglucoside ring. If all three of these hydroxyl groups have been replaced, the DS is 3, the maximum degree of substitution.

In order to achieve useful coalesced fluoropolymer fibers, it is desirable to wash the intermediate fiber structure free of ions absorbed from the coagulation bath as well as to remove other impurities such as additives and/or dispersants that are present in the initial fluoropolymer dispersion and to remove materials that are detrimental to fiber sintering and/or the properties of the final, coalesced fluorinated polymer Fiber.

As used herein, intermediate fiber structure means the extruded and coagulated mixture of the matrix polymer solution and the polymer particle dispersion. The intermediate fiber structure of the present invention has a self supporting length of at least 30 cm after being washed substantially free of ions and impurities. The intermediate fiber structure produced in the practice of the present invention, after washing in near neutral pH water to substantially remove ions and impurities, shows no substantial loss of strength or integrity, and may be worked, for example drawn at a modest draw ratio, and sintered to form a final, coalesced fluorinated polymer fiber or shaped article. The intermediate fiber structure produced by the present invention may be isolated, worked in subsequent processing or used for producing fabrics or batts as is known in this art. The strength of the intermediate fiber structure an be determined by the procedure described in U.S. Pat. Nos. 5,762,846 and 5,820,984.

As will be understood by one skilled in this art, fiber structure includes, as well as typical fiber monofilament and fiber bundle structures, elongated tapes, ribbons, Films and the like.

In the practice of the present invention, the composition of the intermediate fiber structure has a cellulosic ether present as a minor constituent of the fiber solids, while the major constituent is non-melt processible fluoropolymer particles having a weight in the intermediate fiber structure that may be from 3 to 20 times that of the matrix polymer.

In order for the intermediate fiber to be water washable, the matrix polymer must have precisely defined properties of insolubility in water which is near neutral in pH and at process temperatures. In addition, it is preferred that the matrix polymer neither soften or melt at a temperature substantially below that of sintering, otherwise the intermediate fiber structure may stretch, weaken or break under its own weight as it is heated to sintering temperatures.

Nonionic cellulosic ethers, such as hydroxypropylcellulose and hydroxyethylcellulose, provide particularly good spinning compositions for dispersion spinning of fluorinated polymers. DS values that are representative of the matrix polymers employed in the present invention are values that range from about 0.02 to 0.5. Uniformity of substitution for the matrix polymers employed in the present invention is preferable, and is indicated by transparency of the solution formed in about 10% by weight aqueous sodium hydroxide or the substantial absence of insoluble matrix polymer which would collect on a 1 micron pore size filter suitable for the filtration of diluted matrix polymer solutions of aqueous sodium hydroxide.

The matrix solution of any of the matrix polymers employed in the present invention or mixtures thereof, may be prepared by dissolving the particular cellulosic ether in a solution of about 5 to 10% by weight sodium hydroxide.

For hydroxypropylcellulose matrix polymer, a material characterized by having a viscosity of at least 90 mPa·sec when dissolved at 2% by weight in 10% sodium hydroxide solution and measured at 25° C. is preferred, although solutions of lower viscosity material may be successfully spun.

The spinning compositions used in the process of the present invention are made by mixing an aqueous dispersion of fluorinated polymer particles with a solution of the matrix polymer. Aqueous dispersions of non-melt processible fluoropolymer particles, such as those described above are used in the present process. The solutions of matrix polymer should be clear and of a viscosity that assures good mixing with the dispersion. Preferably the concentration of matrix polymer in the solution is from 3 to 10% by weight. These components are then mixed such that the ratio of the weight of the polymer particles to that of the matrix polymer in the intermediate fiber structure is from about 3 to 1 to about 20 to 1, and preferably about 9 to 1.

The spinning composition provided by the invention results in many process advantages as described below.

Process

The present invention provides a process for the dispersion spinning of non-melt-processible fluoropolymer fiber comprising:

(a) forming a mixture of an aqueous dispersion of non-melt-processible polytetrafluoroethylene or modified polytetrafluoroethylene particles having an SSG of less than about 2.40, with an aqueous solution of a matrix polymer, the aqueous dispersion containing an aliphatic alcohol ethoxylate nonionic surfactant and being essentially free of surfactants containing aromatic groups, the aliphatic alcohol ethoxylate having a 20% residuals temperature determined by thermogravimetric analysis (TGA) of less than about 300° C., and the dispersion having an fluorinated surfactant content of less than about 300 ppm;

(b) extruding the mixture into a coagulation bath containing a concentration of ions which coagulate the matrix polymer to form an intermediate fiber structure; and (c) sintering the intermediate fiber structure to decompose the matrix polymer and coalesce the non-melt-processible fluoropolymer particles to form the fiber.

By the term dispersion spinning is meant the process by which a dispersion of insoluble polymer particles is mixed with a solution of a soluble matrix polymer, and this mixture is coagulated by contacting the mixture with a coagulation solution in which the matrix polymer becomes insoluble.

Dispersion spinning is useful for producing fibers from non-melt-processible fluoropolymers. These polymers, which are difficult to form by melt extrusion or solution spinning, may be successfully spun from a mixture of an aqueous dispersion of fluorinated polymer particles mixed with a solution of a suitable matrix polymer. An intermediate structure is formed when this mixture is contacted with a suitable coagulation bath. Although the intermediate structure is mechanically sound, a final, sintered structure is generally formed by heating the intermediate structure to a temperature sufficient to coalesce the fluorinated polymer particles. On sintering the matrix polymer decomposes to form volatile gases and a carbonaceous residue. One advantage of the present invention is that the sintering roll temperature can be reduced because of the lower 20% residuals temperature of the nonionic surfactant present in the aqueous dispersion of fluoropolymer particles that form part of the spinning composition. Lower sintering roll temperatures result in reduced energy costs. Further, the nonionic surfactant is essentially free of aromatic groups that can thermally decompose and be converted to harmful organic aromatic compounds. This results in cleaner air and water emissions and prevents the buildup of tar on sintering rolls. Generally the present invention provides a more environmentally clean manufacturing process for fluoropolymer fiber.

It is preferred to form the fibers in accordance with present invention by extruding the mixture of the matrix polymer solution and the fluorinated particle dispersion into a coagulation liquid which rapidly gels the article. The formed article may then be washed and further processed. The composition of coagulation liquids depends, to some extent, on the particular matrix polymer being used. Useful coagulation liquids include a large variety of aqueous solutions typified but not limited to 40% ammonium acetate-5% acetic acid, 30% acetic acid, or 30% calcium chloride. Of particular value for the cellulose ethers used in this invention is a 5% sulfuric acid-8% sodium sulfate solution. The temperature of the coagulation bath can be adjusted to that which provides the best properties for the intermediate fiber structure, and is typically in the range of 20° C. to 90° C.

The intermediate fiber produced in the present invention is preferably washed substantially free of ions and impurities with no substantial loss of strength. By the term substantially free of ions and impurities is meant that the pH and conductivity of deionized wash water is unchanged after dipping the intermediate fiber into the water. The self supporting length of the washed intermediate fiber is at least 30 cm.

Another advantage of the spinning composition of the present invention containing an aliphatic alcohol ethoxylate nonionic surfactant having a lower 20% residuals temperature and being essentially free of aromatic groups is that less foam is produced in the wash water. Reduced foam generation can be quantified by the five minute foam height test, results of which are shown in Table 2. Five minute foam heights for the aliphatic alcohol ethoxylate surfactants used in this invention are substantially lower than alkyl phenol ethoxiate (Triton® X-100). Aliphatic alcohol ethoxylates used in this invention have five minute foam heights that are preferably less than 100 mm, more preferably less than 50 mm and most preferably less than about 20 mm. Less foam results in less time-intensive work needed by the fiber processor to control and reduce foam generation. Less foam avoids Fiber spinning breaks and leads to increased productivity gains.

From the wash step, the fiber is passed over initial tensioning rolls, passed by stationary bars or combs to partially de-water the fiber and then passed through hot drawing rolls to decompose the matrix polymer and sinter the fluoropolymer. Further drawing, and bleaching steps may be employed for the manufacture of continuous fiber or a step of chopping the fiber into short lengths may be employed to produce a PTFE floc useful as a polymer additive. Fibers produced with the spinning composition of the present invention have been found to have better elongation reducing the frequency of fiber breaks during hot drawing and thereby resulting in better productivity.

Fluoropolymer fibers produced by this invention have any number of uses but are especially desirable in water repellant garments, filtration fabrics and when compounded with engineering plastics, high temperature seals and gaskets. Because of the use of aliphatic alcohol ethoxylate nonionic surfactant having a lower residuals temperature and being essentially free of surfactants containing aromatic groups, the fluoropolymer fiber is well suited to for compounding with polyacetals. The cleaner burnoff of the surfactants used in the present invention results in less residuals that could attack the formaldehyde groups of the polyacetal resin. It has been common in past production of fiber to subject sintered fiber to further oven baking to remove residuals which are attributable to the phenol groups of alkyl phenol ethoxylates. The fiber produced from the spinning composition of the present invention has no residual phenol groups and an acceptable pH after sintering, thereby providing the ability to eliminate the time-consuming and expensive oven baking step. The improved fluoropolymer fiber-reinforced acetal products are especially desired for high temperature seals and gaskets. Polyacetals (sometime referred to as acetal resins) are a class of polyoxymethylene compositions described for example in U.S. Pat. Nos. 5,318,813; 5,344,882; and 5,286,807 and commercialized available from E.I. du Pont de Nemours and Company, Wilmington, Del. under the trademark DELRIN®.

Methods for Property Determination

Raw Dispersion Properties:

Solids content of PTFE raw (as polymerized) dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.)

Raw dispersion particle size (RDPS) is measured by photon correlation spectroscopy.

Surfactant Content:

The surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is usually stated in weight % based on PTFE solids.

Resin Properties:

Standard specific gravity (SSG) of PTFE fine powder resin is measured by the method of ASTM D-4895. If a surfactant is present, it can be removed by the extraction procedure in ASTM-D-4441 prior to determining SSG by ASTM D4895.

Melt creep viscosity (MCV) is measured at 380° C. by a modification of the tensile creep method disclosed in U.S. Pat. No. 3,819,594, with the mold at room temperature, using a molding pressure of 200 kg/cm$^2$ (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation.

Copolymer Composition:

Comonomer content of the modified PTFE resins is determined by Fourier transform infrared spectroscopy using the method disclosed in U.S. Pat. No. 4,837,267. For PPVE-modified PTFE, a multiplicative factor of 0.97 derived from the calibration curve is used to convert the ratio of the absorbance at 995 cm$^{-1}$ to that at 2365 cm$^{-1}$ to PPVE content in weight %.

20% Residuals Temperature and Thermal Decomposition Temperature:

The 20% residuals temperatures and thermal decomposition temperatures of surfactants are determined by thermogravimetric analysis (TGA) using a modified version of ASTM method E-1131 in air. For 20% residuals temperatures, samples to be tested have at least 90% by weight surfactant content. If the surfactant to be tested contains more than 10% by weight water or other volatile solvents, such solvents should be removed to no more than 10%. Alternatively, to adjust for greater than 10% solvent, the residuals weight is recalculated based on the weight fraction of surfactant content in the sample. The samples are heated at 10° C./min from room temperature to 204° C. Upon reaching 204° C., the heating rate is reduced to 2° C./min until the samples reach 482° C. At 482° C., the sample returns to being heated at 10° C./min until it reaches 600° C. The temperature at which weight loss to a 20% residuals of the original sample is reached is the 20% residuals temperature.

20% residuals temperature and thermal decomposition temperature results for selected nonionic surfactants are summarized in Table 1.

TABLE 1

| Surfactant | Alcohol Structure | Surfactant State @ RT | Cloud Point ° C. | 20% Residuals Temperature, ° C. | Thermal Decomposition Temperature, ° C. |
|---|---|---|---|---|---|
| Genapol ® X 080 | Branched | Liquid | 75 | 274 | 228 |
| Serdox ® NBS 6,6 | Primary, linear | Liquid | 64 | 242 | 220 |
| Tergitol ® 15-S-9 | Secondary, linear | Liquid | 60 | — | 225 |
| Triton ® X-100 | Alkyl Phenol | Liquid | 65 | 295 | 266 |
| Tergitol ® TMN-100X | Secondary, branched | Liquid | 65 | 281 | 226 |
| Tergitol ® TMN-10 | Secondary, branched | Liquid | 76 | 260 | 225 |
| Tergitol ® TMN-6 | Secondary, branched | Liquid | 36 | 244 | 223 |
| Neodol 1-7 | Primary, linear | Liquid | 58 | 250 | 218 |

Tergitol ® is manufactured by Dow Chemical Corporation.
Serdox ® is manufactured by by Servo Huls, Delden, the Netherlands.
Neodol ® is manufactured by Shell Chemical.
Genapol ® is available from Clariant GmbH.
Triton ® is manufactured by Dow Chemical Corporation.

Foam Data

The degree of foaming caused by a nonionic surfactant can be quantified by the Ross-Miles Foam Test (ASTM D 1173-53, reapproved 2001) in which droplets of surfactant are dropped into a column positioned over a surfactant solution of the same surfactant being dropped. Surfactant concentration is 0.1 wt % surfactant in aqueous solution at 25° C. (77° F.). The bubble height is measured initially after the drop and then again in 5 minutes. The measurement after five minutes is referred to as five minute foam height.

TABLE 2

| Surfactant | Alcohol Structure | Initial height (mm) | Height after 5 min (mm) |
|---|---|---|---|
| Triton ® X-100 | Alkyl Phenol | 160 | 145 |
| Tergitol ® 100X | Secondary, branched | 150 | 24 |
| Tergitol ® TMN-10 | Secondary, branched | 113 | 10 |
| Tergitol ® TMN-6 | Secondary, branched | 118 | 5 |
| Tergitol ® 15-S-9 | Secondary, linear | 95 | 20 |

What is claimed is:

1. A spinning composition useful for the dispersion spinning of non-melt-processible fluoropolymer fiber comprising:
a mixture of an aqueous solution of a matrix polymer and an aqueous dispersion of non-melt-processible polytetrafluoroethylene or modified polytetrafluoroethylene particles having an SSG of less than about 2.40, said aqueous dispersion containing an aliphatic alcohol ethoxylate nonionic surfactant and containing less than about 0.5 weight % surfactants containing aromatic groups, said aliphatic alcohol ethoxylate having a 20% residuals temperature determined by thermogravimetric analysis (TGA) of less than about 290° C., and said dispersion having a fluorinated surfactant content of less than about 300 ppm.

2. The spinning composition of claim 1 wherein the SSG of said non-melt-processible fluoropolymer particles is from about 2.14 to about 2.40.

3. The spinning composition of claim 1 wherein the matrix polymer is a cellulosic ether polymer.

4. The spinning composition of claim 1 wherein the matrix polymer is selected from the group consisting of methylcellulose, hydroxyethylcellulose, methylhydroxypropylcellulose, hydroxypropylmethylcellulose, hydroxypropylcellulose, ethylcellulose and carboxymethylcellulose.

5. The spinning composition of claim 1 wherein the five minute foam height determined by ASTM D 1173-53 of said aliphatic alcohol ethoxylate surfactant is less than about 100 mm.

6. The spinning composition of claim 1 wherein the five minute foam height determined by ASTM D 1173-53 of said aliphatic alcohol ethoxylate surfactant is less than about 50 mm.

7. The spinning composition of claim 1 wherein the five minute foam height determined by ASTM D 1173-53 of said aliphatic alcohol ethoxylate surfactant is less than about 20 mm.

* * * * *